US012637345B2

(12) United States Patent
Paauwe et al.

(10) Patent No.: US 12,637,345 B2
(45) Date of Patent: May 26, 2026

(54) COUPLER DEVICE

(71) Applicant: Heineken Supply Chain B.V., Amsterdam (NL)

(72) Inventors: Arie Maarten Paauwe, Amsterdam (NL); Peter Henri Samuel Wigman, Amsterdam (NL)

(73) Assignee: Heineken Supply Chain B.V., Amsterdam (NL)

( * ) Notice: Subject to any disclaimer, the term of this patent is extended or adjusted under 35 U.S.C. 154(b) by 165 days.

(21) Appl. No.: 18/722,702

(22) PCT Filed: Dec. 22, 2022

(86) PCT No.: PCT/NL2022/050753
§ 371 (c)(1),
(2) Date: Jun. 21, 2024

(87) PCT Pub. No.: WO2023/121461
PCT Pub. Date: Jun. 29, 2023

(65) Prior Publication Data

US 2025/0100864 A1 Mar. 27, 2025

(30) Foreign Application Priority Data

Dec. 23, 2021 (EP) .................................... 21217594

(51) Int. Cl.
*B67D 1/08* (2006.01)

(52) U.S. Cl.
CPC .................................. *B67D 1/0841* (2013.01)

(58) Field of Classification Search
CPC .................................................... B67D 1/0841
(Continued)

(56) References Cited

U.S. PATENT DOCUMENTS

| | | | | |
|---|---|---|---|---|
| 12,187,354 B2 * | 1/2025 | Smith | .................. | H01Q 1/3275 |
| 2018/0208360 A1 * | 7/2018 | Brinkworth | .......... | B67D 1/1477 |

(Continued)

FOREIGN PATENT DOCUMENTS

| | | |
|---|---|---|
| GB | 2578883 A | 6/2020 |
| WO | 2007148360 A1 | 12/2007 |

(Continued)

*Primary Examiner* — Jeremy Carroll

(74) *Attorney, Agent, or Firm* — Banner & Witcoff, Ltd.

(57) ABSTRACT

A coupler device is arranged for bringing in fluid communication a beverage chamber of a beverage container and a beverage dispensing line. The coupler device comprises a housing with a coupling organ arranged for detachably coupling the housing to the beverage container. A beverage channel extends through the housing between a beverage inlet and a beverage outlet, the beverage inlet configured for connecting a first dispensing line part of the beverage dispensing line and the beverage outlet configured for connecting a second dispensing line part of the beverage dispensing line. A broach element is movably arranged relative to the housing for broaching the beverage container to bring the beverage chamber in fluid communication with the first dispensing line part. The coupler housing comprises a cover movably arranged to move between an open position in which the cover enables access to the beverage inlet for connecting the first dispensing line part and a closed position in which the cover prevents a connecting of the first dispensing line part to the beverage inlet. The coupler device further comprises securing means configured for securing the cover in the closed position.

15 Claims, 8 Drawing Sheets

(58) Field of Classification Search
USPC .......................................................... 222/544
See application file for complete search history.

(56) References Cited

U.S. PATENT DOCUMENTS

| | | | | |
|---|---|---|---|---|
| 2020/0087136 | A1 | 3/2020 | Ye et al. | |
| 2020/0283282 | A1 * | 9/2020 | Caputo ................ | B67D 1/1247 |
| 2023/0331536 | A1 * | 10/2023 | Wigman .............. | B67D 1/0839 |
| 2024/0253964 | A1 * | 8/2024 | Vandekerckhove ......................... | B67D 1/0857 |
| 2025/0059017 | A1 * | 2/2025 | Paauwe ................ | B67D 1/0845 |
| 2025/0100865 | A1 * | 3/2025 | Schutte ................ | B67D 1/0887 |

FOREIGN PATENT DOCUMENTS

| | | | |
|---|---|---|---|
| WO | 2013006655 | A1 | 1/2013 |
| WO | 2021107781 | A1 | 6/2021 |

* cited by examiner

COUPLER DEVICE

RELATED APPLICATIONS

This application is a National Stage Application under 35 U.S.C. 371 of co-pending PCT application PCT/NL2022/050753 designating the United States and filed Dec. 22, 2022; which claims the benefit of EP Application Serial No. 21217594.7 and filed Dec. 23, 2021, each of which are hereby incorporated by reference in their entireties.

FIELD

The invention relates to coupler devices for coupling a beverage container to a beverage dispensing line, particularly for beer dispensing systems.

BACKGROUND

Coupler devices are arranged for fluidly connecting a beverage chamber of a beverage container, e.g. a beer keg, to a beverage dispensing line. Conventional coupler devices typically include a housing with a beverage channel extending therethrough between a beverage inlet and a beverage outlet, the coupler inlet being connectable to a beverage container outlet and the outlet connectable to a dispenser, such as a faucet, which is arranged at a downstream end of the dispensing line. Once connected, the dispensing of the beverage from the container can be controlled by the dispenser. To this end coupler devices often comprise a broach element movably arranged relative to the housing for broaching the beverage container, i.e. opening the beverage container outlet, to bring the beverage chamber in fluid communication with the dispensing line. Once broached, beverage can flow from the beverage container through the beverage channel towards the dispenser. Some coupler devices have the beverage inlet connected to a first dispensing line part extending between the beverage container and the beverage inlet and the beverage outlet connected to a second dispensing line part extending between the beverage outlet and the dispenser. The first dispensing line part is for example a conduit having a length and/or providing a flow path that reduces a contamination rate of the beverage in the beverage container with micro-organisms migrating through the beverage line. The first dispensing line part is usually attached to the coupler device with an end portion having attachment means that fluid tightly snap or clamp in the beverage inlet. Although this provides an adequate connection between the first dispensing line part and the coupler device for flowing beverage from the beverage container to the beverage channel while also allowing for an intentional detachment of the first dispensing line part from the coupler device, for example to change the beverage container to replace an empty copy for a full copy, there is a risk of the first dispensing line part unintentionally detaching from the coupler device. This may cause spillage of beverage, contamination of beverage, and discomfort for a user.

SUMMARY

It is an object to provide an coupler device that has a reduced risk of a beverage dispensing line attached thereto from unintentionally detaching. It is a further object to provide a coupler device that is easy to use by a user.

According to an aspect, a coupler device is provided for fluidly connecting a beverage chamber of a beverage container to a beverage dispensing line. The coupler device comprises a housing with a coupling organ arranged for detachably coupling the housing to the beverage container, a beverage channel extending through the housing between a beverage inlet on a beverage inlet side of the housing and a beverage outlet at a beverage outlet side of the housing, the beverage inlet configured for connecting a first dispensing line part of the beverage dispensing line and the beverage outlet configured for connecting a second dispensing line part of the beverage dispensing line, and a broach element movably arranged relative to the housing for broaching the beverage container to bring the beverage chamber in fluid communication with the first dispensing line part, wherein the coupler housing comprises a cover movably arranged to move between an open position in which the cover enables access to the beverage inlet for connecting the first dispensing line part and a closed position in which the cover prevents a disconnecting of the first dispensing line part from the beverage inlet, and wherein the coupler comprises securing means configured for securing the cover in the closed position. In use of the coupler device the housing is coupled to the beverage container by means of the coupling organ such as a seat provided with an internal screw thread that fits on an external screw thread provided on a surface of the beverage container. The first dispensing line part extends from the beverage chamber to the beverage inlet of the coupler device for supplying a beverage fluid from the beverage chamber to the beverage channel when the beverage container is opened by the broach element. In order to prevent an undesired decoupling or detachment of the first dispensing line part from the coupler device, particularly when a beverage fluid is flown through the beverage line, the cover is brought and secured in the closed position such that the first dispensing line part cannot be disconnected from the beverage inlet. For example the cover may clamp or otherwise mechanically force the first dispensing line part against the coupler housing.

Optionally, the cover comprises a door pivotably connected to the coupler housing, preferably to the inlet side of the coupler housing.

In an embodiment of the coupler device the cover in the closed position and the inlet side of the housing together define a chamber arranged for receiving at least an end portion of the first dispensing line part. For example the first dispensing line part, such as a flexible conduit, may be attached to the beverage inlet with an end portion of the first dispensing line part, which end portion fits in the chamber. Preferably the end portion of the first dispensing line part and the chamber are shaped and/or sized and/or otherwise designed or adapted with respect to each other to have the end portion fit in the chamber, preferably with a relatively tight fit, i.e. under normal handling circumstances of the coupler device a connection between the first dispensing line part and the coupler device is maintained when the end portion is fitted in the chamber and coupled to the beverage inlet. A risk of the first dispensing line part unexpectedly or undesirably detaching from the coupler device is hereby reduced.

In a preferred embodiment of the coupler device a cooling body is provided and arranged to cool the chamber and/or the end portion of the first dispensing line part when connected to the beverage inlet and/or fitted in the chamber. The cooling is an effective means to reduce a migration rate of microorganisms from traveling through the first dispensing line part to the beverage chamber. Optionally the cooling body is part of the coupler housing, e.g. a surface thereof, near to or adjacent the chamber. For example the cooling body comprises a plate like body defining an inner side surface of the chamber opposite an outer side surface of the chamber defined by the cover. The cooling body is optionally cooled with a cooling fluid, for example a cold liquid such as water may be flown along a surface of the cooling body to maintain the cooling body at a desired cooling temperature.

In a particular embodiment of the coupler device the securing means for securing the cover in the closed position are operatively coupled to the broach element and configured to secure the cover in the closed position in dependence on a position of the broach element. As such the securing means may particularly secure the cover in the closed position when the beverage container is broached, so as to prevent the first dispensing line part from detaching when beverage flows through the dispensing line. In a non-broaching position of the broach element, the securing means may release the cover to enable movement of the cover, for example to bring the cover in an open position to allow an intentional detachment of the first dispensing line part from the coupler device.

Optionally the securing means comprise a latch movably arranged relative to the cover in the closed position between a locking position in which the cover is secured in the closed position and a release position in which the cover is free to move between the closed position and the open position. The latch may for example physically block the cover from moving in the open position. Optionally, the latch and cover have cooperating surfaces to this end. For example the latch may have a chamfered end cooperating with a corresponding chamfered surface on the cover for enabling movement of the cover in one direction relative to the latch and a shoulder or other blocking edge to prevent movement of the cover in the opposite direction.

A preferred embodiment of the coupler device has the latch coupled to the coupler housing with biasing means configured to bias the latch in the release position. Preferably the latch secures the cover only in the closed position and releases the cover upon actuation by a user, for example by actuating a manual lever provided to this end.

Optionally, the biasing means comprise a spring or spring-like body. Preferably the biasing means comprise a leaf spring or plate spring connected on one end with the latch.

In a preferred embodiment of the coupler device the biasing means are operatively coupled to the broach element and configured to secure the cover in the closed position in dependence on a position of the broach element. Particularly the broach element when brought in a broaching position may act against the biasing means, such as a leaf spring connected to the latch, to maintain the latch in a securing position of the cover in the closed position. Preferably the biasing means bias the latch in a releasing position when the broach element is in a non-broaching position.

Optionally the broach element comprises a broach piston inside the housing, the broach piston coupled to a broach lever of the coupler device for moving the broach piston axially between a lowered position relative to the coupling organ for broaching the beverage container and a raised position relative to the coupling organ. Preferably the broach piston is arranged to act on the securing means to secure the cover in the closed position when the broach piston is in the lowered position and to release the cover to enable movement to the open position when the broach piston is in the raised position.

In a preferred embodiment of the coupler device the securing means comprise a movable blocking plate having a through opening arranged to enable axial movement of the broach piston through the blocking plate between the lowered position and raised position when the blocking plate is in an unblocking position and to prevent axial movement of the broach piston when the blocking plate is in a blocking position. In use of the coupler device a position of the blocking plate relative to the broach piston determines whether the broach piston can be moved. For example the blocking plate may be arranged in the coupler housing to be actuated by a user to move in order to enable subsequent broaching or to prevent subsequent broaching of a beverage container as desired by the user.

A particular embodiment of the coupler device has the blocking plate coupled to the latch and biased with biasing means against the coupler housing and configured to secure the door against the coupler housing when the blocking plate is in the unblocking position and the broach piston in the lowered position.

Optionally the securing means comprise a lever pivotably coupled to the coupler housing and arranged to pivot between a cover securing position in which the lever clamps the cover against the housing and a cover releasing position in which the lever enables the cover to be moved in the open position.

Preferably the lever is a broach lever arranged to actuate the broaching element, wherein the broaching element is in a broaching position to broach the beverage container when the lever is in the cover securing position and the broaching element is in a non broaching position when the lever is in the cover releasing position.

In a particular embodiment of the coupler device the lever comprises a lever arm arranged to acts against the cover in the cover securing position. For example the lever arm may be rotated against the cover upon a pivoting movement of the lever with respect to the coupler housing.

A preferred embodiment of the coupler device has the lever arm comprising a locking groove and the cover comprising a projection element, the locking groove arranged to enable movement of the projection element over the length of the groove along the lever arm. For instance the projection element may be a protrusion such as a tab or nob extending from the cover which protrusion upon closing the cover fits in the locking groove and may be moved there through when the lever is pivoted in a closing direction with respect to the coupler housing until a securing position of the cover is reached. Pivoting of the lever in an opening direction opposite to the closing position moves the protrusion from the securing position out of the securing groove to enable opening of the cover.

In another aspect there is provided a system comprising a beverage container having a beverage chamber for containing a beverage, particularly a malt-based beverage such as beer, the container having a container outlet provided with a sealing member arranged to enable opening of the container outlet, and a coupler device in accordance with the invention herein, the broach element of the coupler device being configured, when coupled to the container, for opening the container outlet by movement of the broach element.

Optionally, the system comprises a first tube forming the first dispensing line part, the first tube being attached to the beverage container outlet at a upstream end of the first tube; and a second tube forming the second dispensing line part, the second tube being attached to a dispenser at a downstream end of the second tube, wherein the coupler device is configured for coupling its inlet to a downstream end of the first tube, and for coupling its outlet to an upstream end of the second tube.

It will be appreciated that any of the aspects, features and options described herein can be combined, it will particularly be appreciated that any of the aspects, features and options described in view of the coupler device apply equally to the system, and vice versa.

BRIEF DESCRIPTION OF THE DRAWINGS

Embodiments of the present invention will now be described in detail with reference to the accompanying drawings in which.

DETAILED DESCRIPTION

Figure 1:
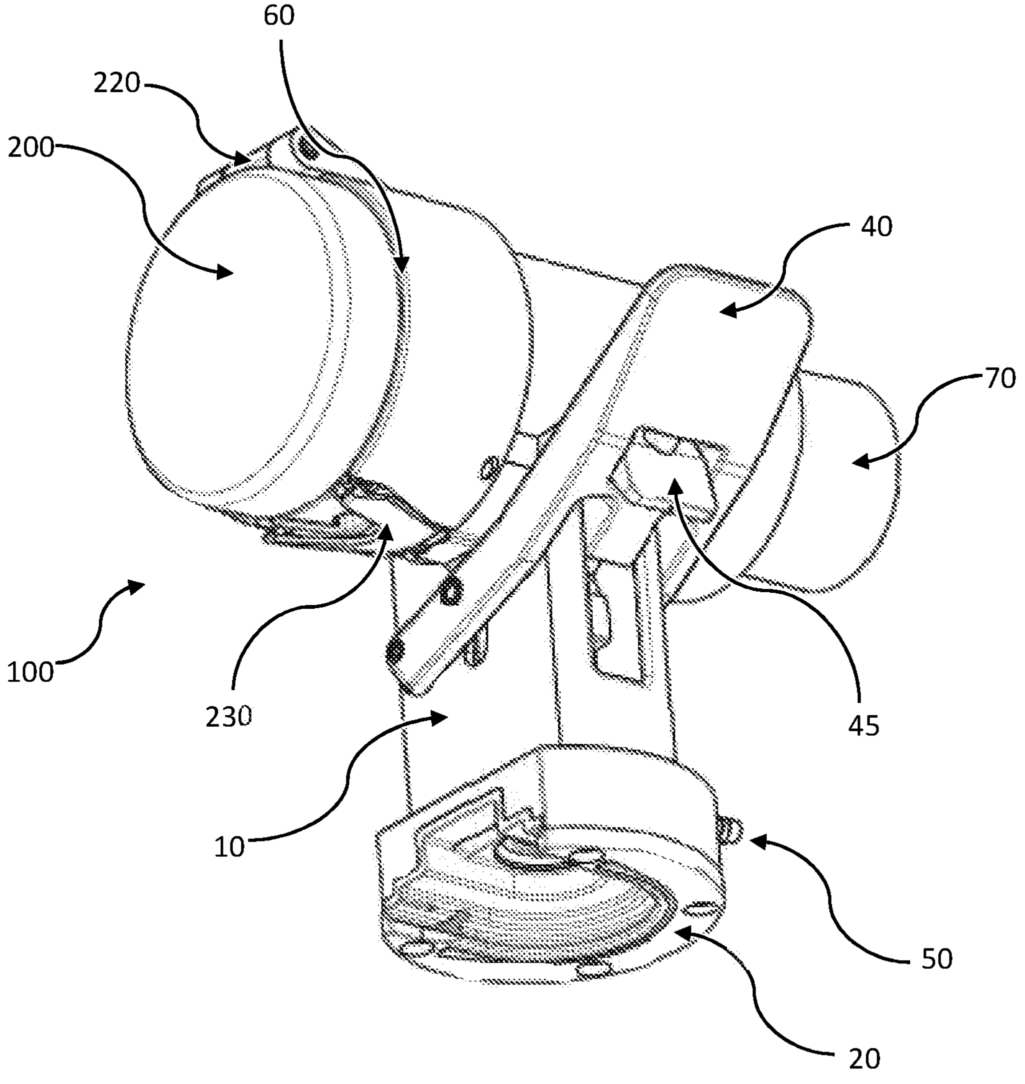
FIG. 1 shows an example of an embodiment of a coupler device according to the invention.

FIG. 1 shows an exemplary coupler device 100. The coupler device comprises a housing 10 with a coupling organ 20 for coupling the housing 10 to a beverage container, such as a beer keg. The beverage container includes a container body that delimits a beverage chamber for holding a beverage. A broach element 30, e.g. a broach piston, is provided in the housing 20 for broaching the beverage container. The broach element 30 may for example be arranged to open a container seal of the beverage container. The broach element 30 is movable relative to the housing 10 in a vertical direction between a raised position relative to the coupling organ 20 and a lowered position relative to the coupling organ 20. The broach element 30 can be actuated using a broach lever 40, for moving the broach element 30 from the raised position downwardly to the lowered position to enable broaching of a beverage container in use of the coupler device and upwardly to release the be broach element 30 from the container. The broach lever 40 is to this end pivotably connected to the housing 10 by a pivot axis and coupled to the broach element 30. The broach lever is provided with a manually operable lock 45 to enable locking of the broach lever in a pivot position to prevent an undesired actuation of the broach element.

In this example, the coupler device 100 comprises a gas conduit having a gas inlet port 50 for connecting a gas tube thereto. The gas conduit extends in this example through the coupler housing 10 between the gas inlet port 50 and a gas outlet port which is connectable to a gas inlet of the beverage container.

The coupler device 100 comprises a beverage channel 80 that extends through the housing 10 between an beverage inlet 81 provided at an inlet side 60 of the housing 10 and an outlet 82 provided at an outlet side 70 of the housing 10. The beverage channel 80 particularly comprises a section that extends in a horizontal direction, transverse to the direction of movement of the broach element.

Figure 2A:
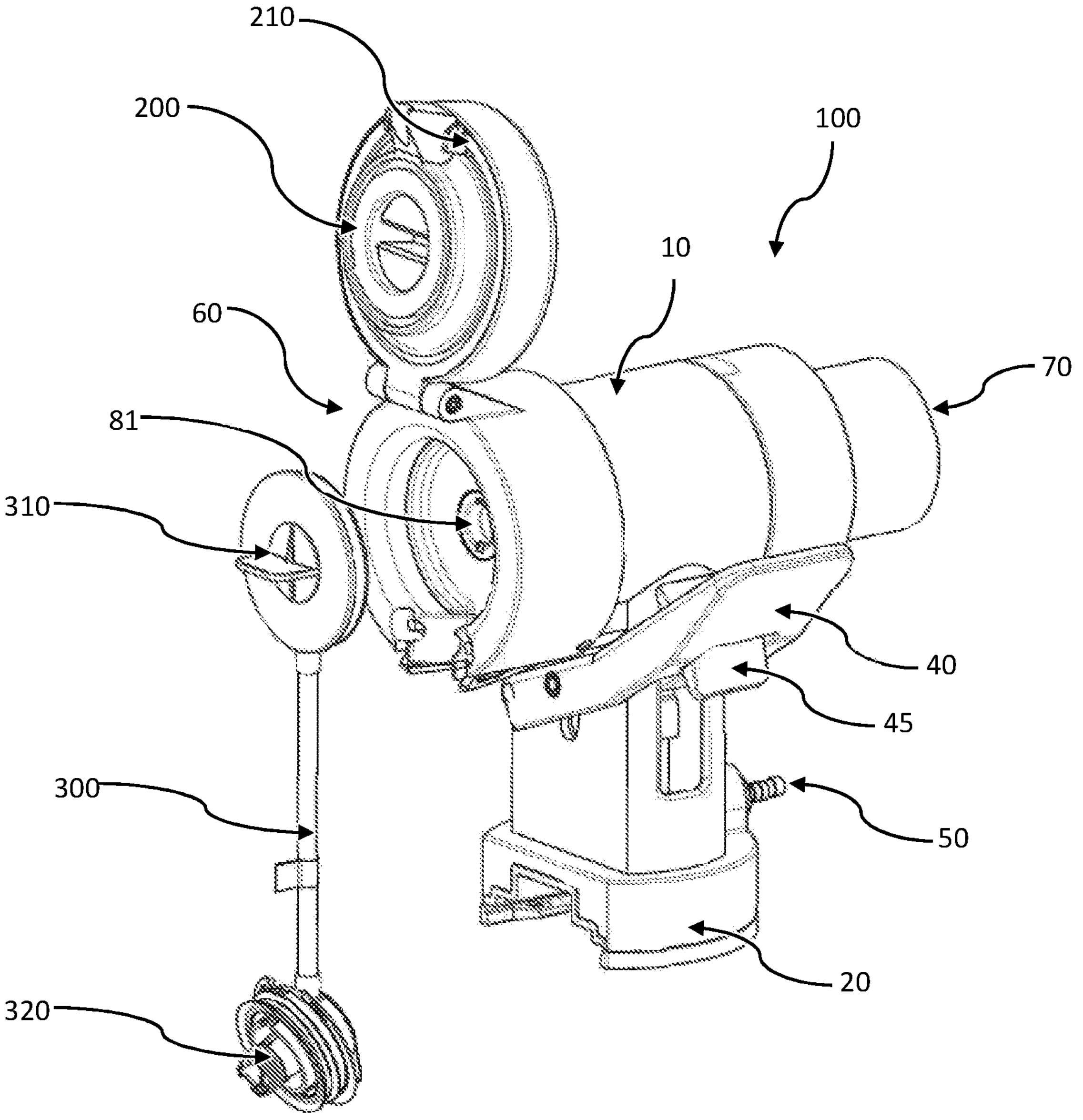
FIGS. 2*a*, 2*b*, 2*c* show respectively a perspective view, another perspective exploded view and a side view of the coupler device of FIG. 1 together with a first dispensing line part respectively separately and coupled to each other.

The coupler device 100 further comprises a cover 200 formed by a door that is pivotably connected to the coupler housing 10 with a pivoting axis 220. The door 200 can be pivoted to move between a closed position shown in FIG. 1 and an open position shown in FIG. 2*a*. In the open position the door enables access to the beverage inlet 81. In the closed position the door 200 and the inlet side 60 of the coupler housing 10 define a chamber as best seen in FIG. 2*a*. The coupler device comprises a cooling body inside the coupler housing, which cooling body is arranged to cool the chamber and/or the end portion of a dispensing line part when connected to the beverage inlet. The cooling body may be cooled with a cooled fluid supplied to the coupler device through a cooling conduit, for example a cooling conduit coaxially provided with the beverage channel.

Figure 2B:
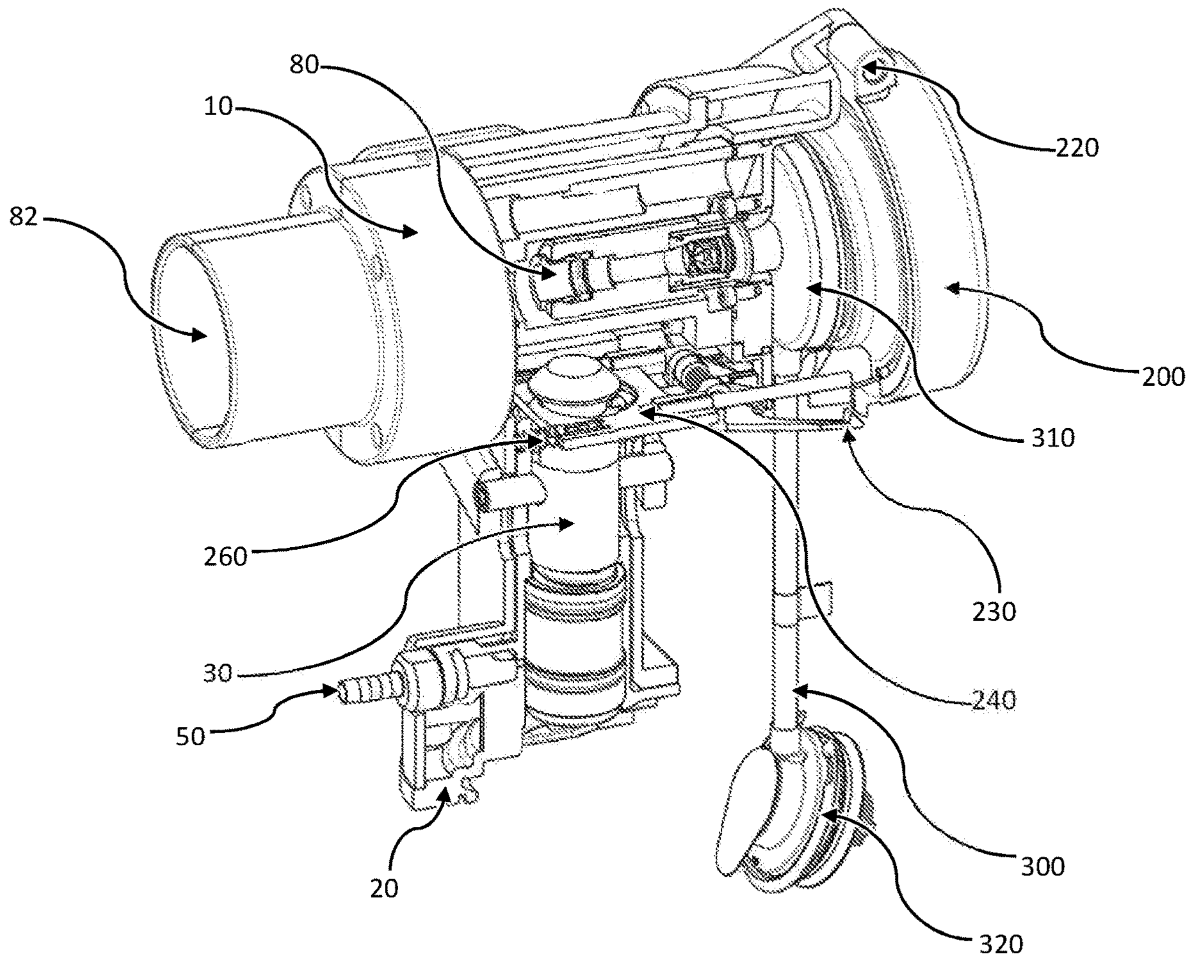
Figure 2C:
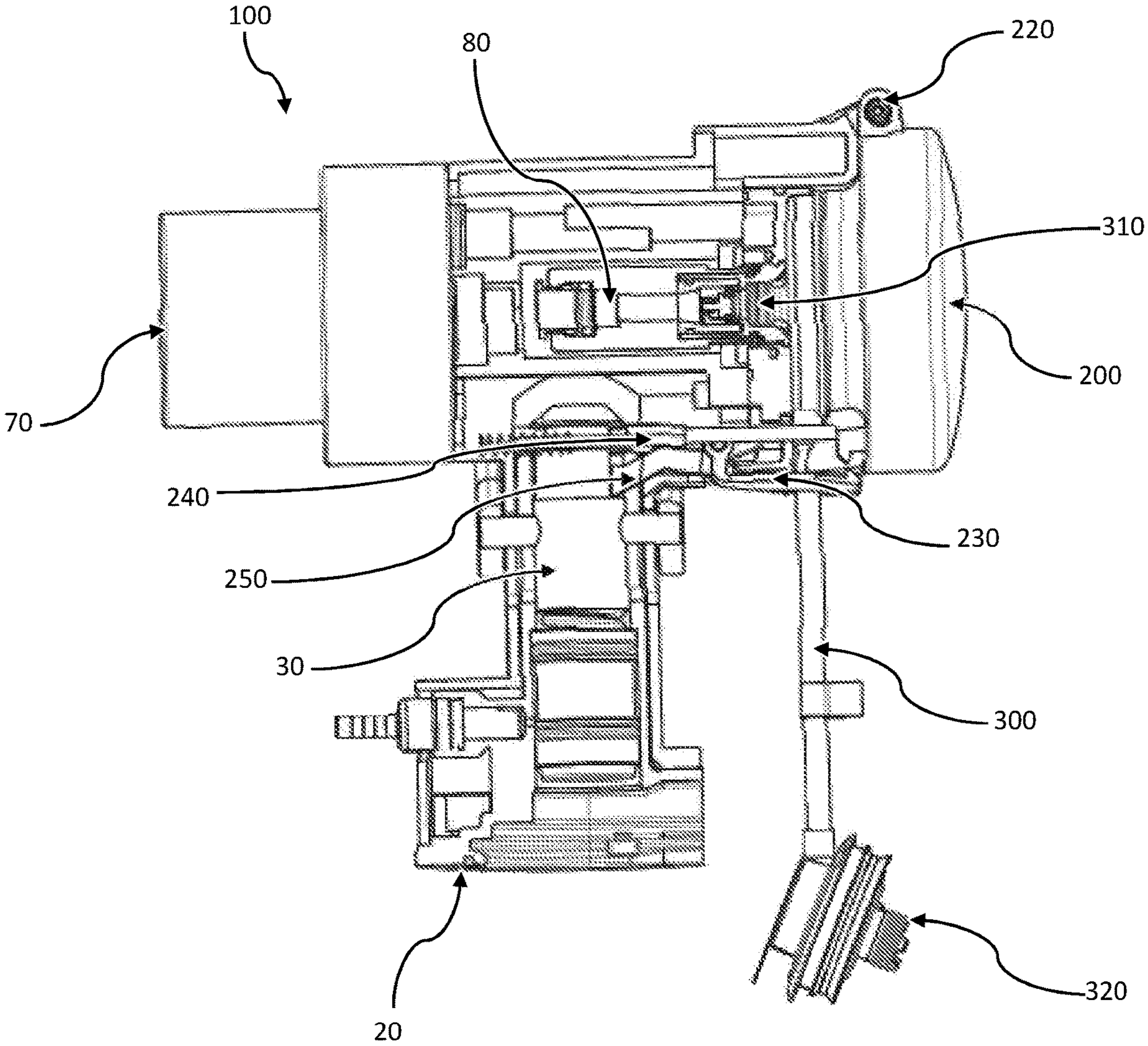

FIGS. 2*a*, 2*b* and 2*c* show a view of the coupler device 100 as shown in FIG. 1 together with a first dispensing line part 300 respectively uncoupled and coupled to each other. As shown the beverage inlet 81 is configured for being releasably connected with a first tube that forms the first dispensing line part 300. The first tube to this end is provided with a connection body 310 that fits in the chamber between the cover 200 and the beverage inlet 81 when the cover 200 is in the closed position. The opposite end of the first tube 300 is provided with an adapter body 320 that is configured and arranged to be attached in the beverage container outlet.

The connection body 310 can be inserted in the chamber for connecting the first dispensing line part 300 to the beverage inlet 81 when the cover 200 is in the open position. In the closed position of the cover 200 the chamber is closed off so that inserting or removing of the connection body 310 is not possible. In use of the coupler device with a beverage container first the tube 300 is connected to the beverage inlet 81 before the cover is closed thereby clamping the connection body 310 against the inlet side 60 of the coupler housing adjacent the cooling body such that the connection body 310 is cooled. The coupler device is provided with securing means 230 for securing the cover in the closed position. The securing means 230 in this example of the coupler device comprise a latch 230 movably arranged relative to the door 200 in the closed position between a locking position in which the door is secured in the closed position and a release position in which the door is free to move between the closed position and the open position. The latch 230 is coupled to the coupler housing with biasing means configured to bias the latch in the release position. The latch 230 is operatively coupled to the broach element 30 and configured to secure the door in the closed position in dependence on a position of the broach element. Particularly, biasing means 250 formed by a plate spring are operatively coupled to the broach element and the latch 230 and configured to secure the door 200 in the closed position by means of the latch in a broaching lowered position of the broach element 30 and to release the door 200 by biasing the latch 230 in a door release position when the broach element is in a non-broaching raised position. The broach element 30 comprises a broach piston inside the housing which piston is coupled to the broach lever 40 for moving the broach piston axially between the lowered position and the raised position. The securing means 230 further comprise a movable blocking plate 240 having a through opening arranged to enable axial movement of the broach piston through the blocking plate between the lowered position and raised position when the blocking plate is in an unblocking position and to prevent axial movement of the broach piston when the blocking plate is in a blocking position. The blocking plate 240 is coupled to the latch and biased with spring means 260 against the coupler housing and configured to secure the door against the coupler housing when the blocking plate is in the unblocking position and the broach piston in the lowered position.

The beverage outlet 82 of the beverage channel 80 is configured to be connected to a second tube that forms a second dispensing line part. The second tube may be attached to a dispenser, e.g. a faucet, at a downstream end of the second tube. The second tube may for example be permanently connected to the beverage outlet 82 of the coupler device. Prior to broaching the beverage container, a downstream end of the first tube can be connected to the inlet, to create a fluid connection between first tube and the second tube via the beverage channel 80 of the coupler device 100. Hence a dispensing line is formed between the beverage chamber and the dispenser.

Figure 3A:
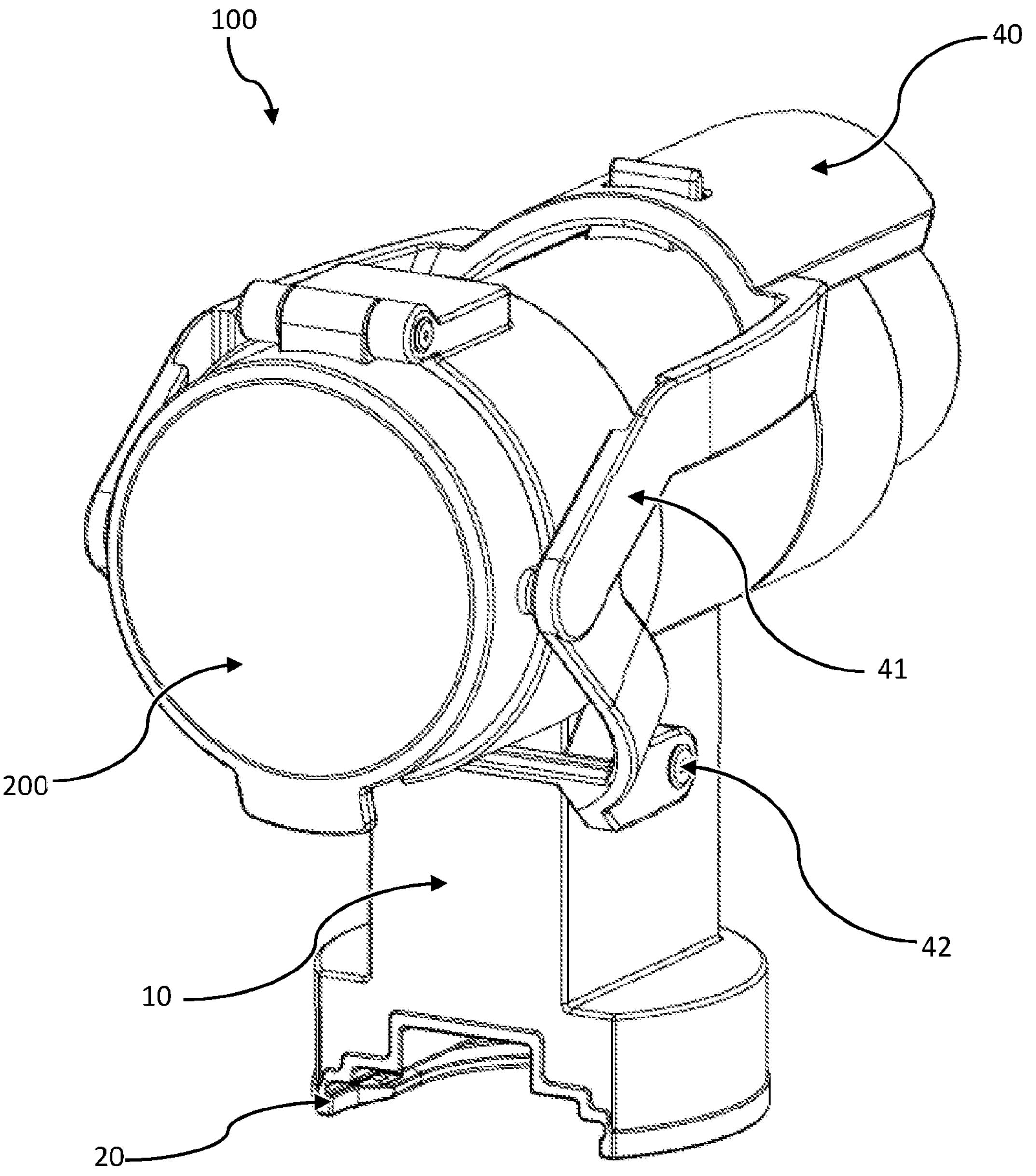
FIGS. 3*a*-3*d* show an example of another embodiment of a coupler device according to the invention in different views.
Figure 3B:
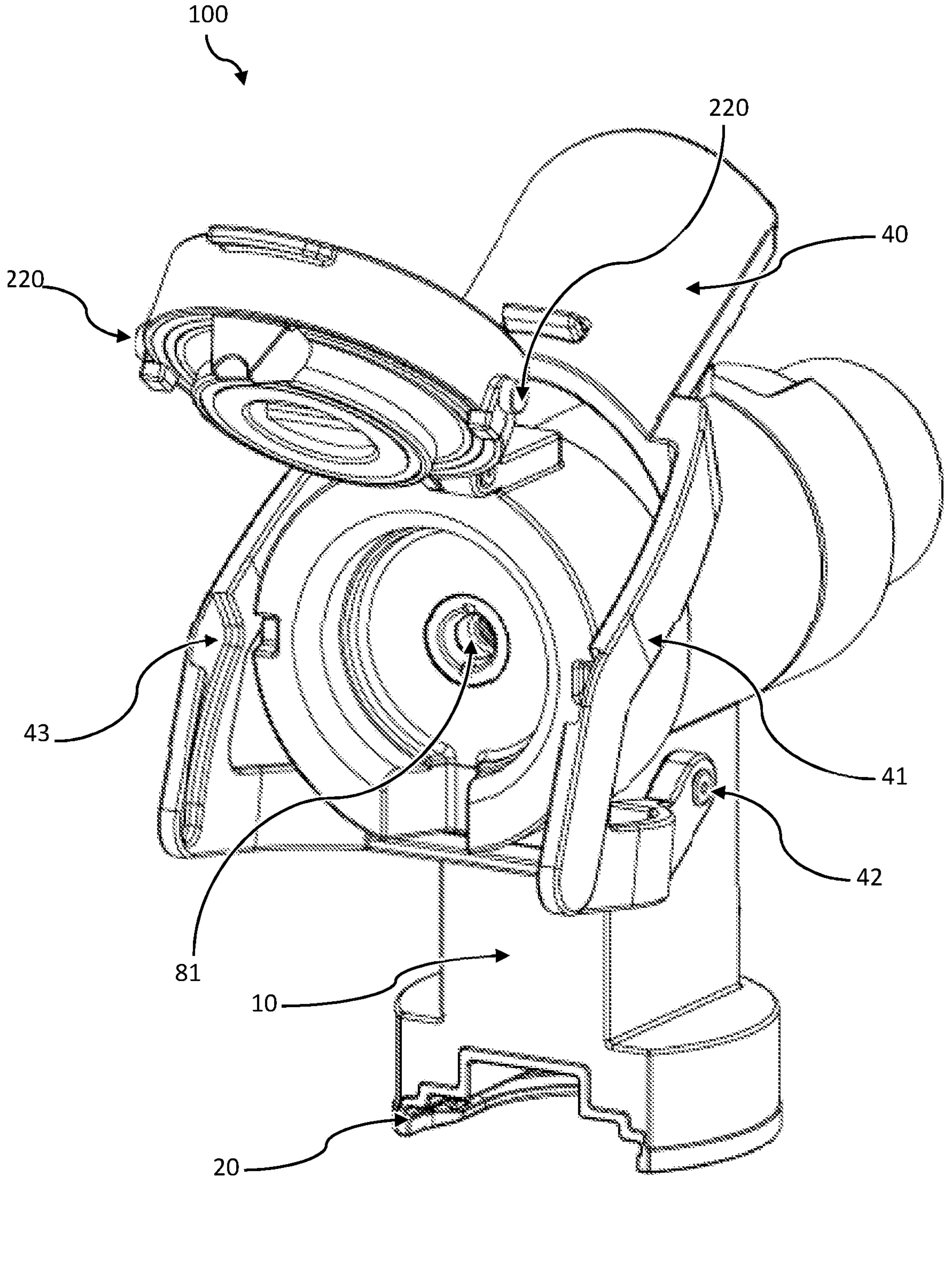
Figure 3C:
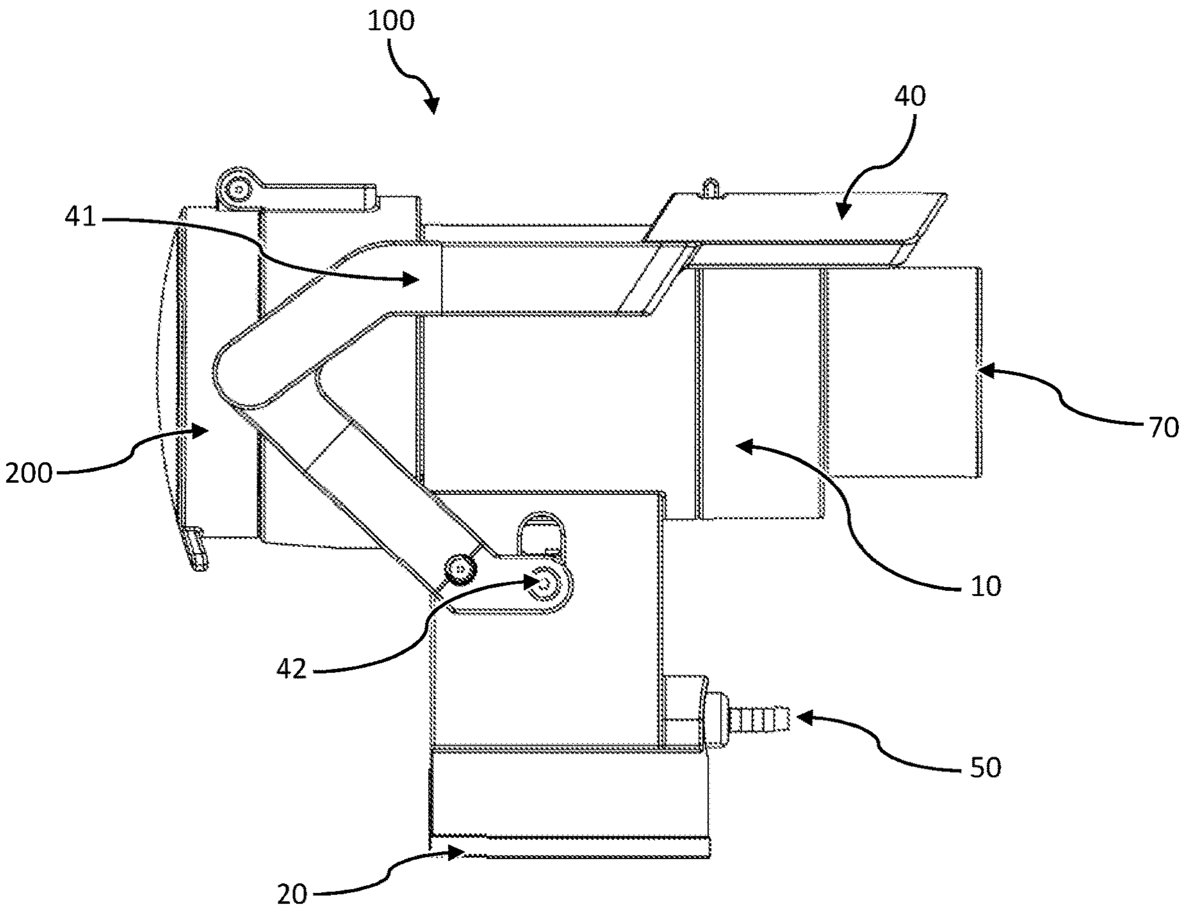
Figure 3D:
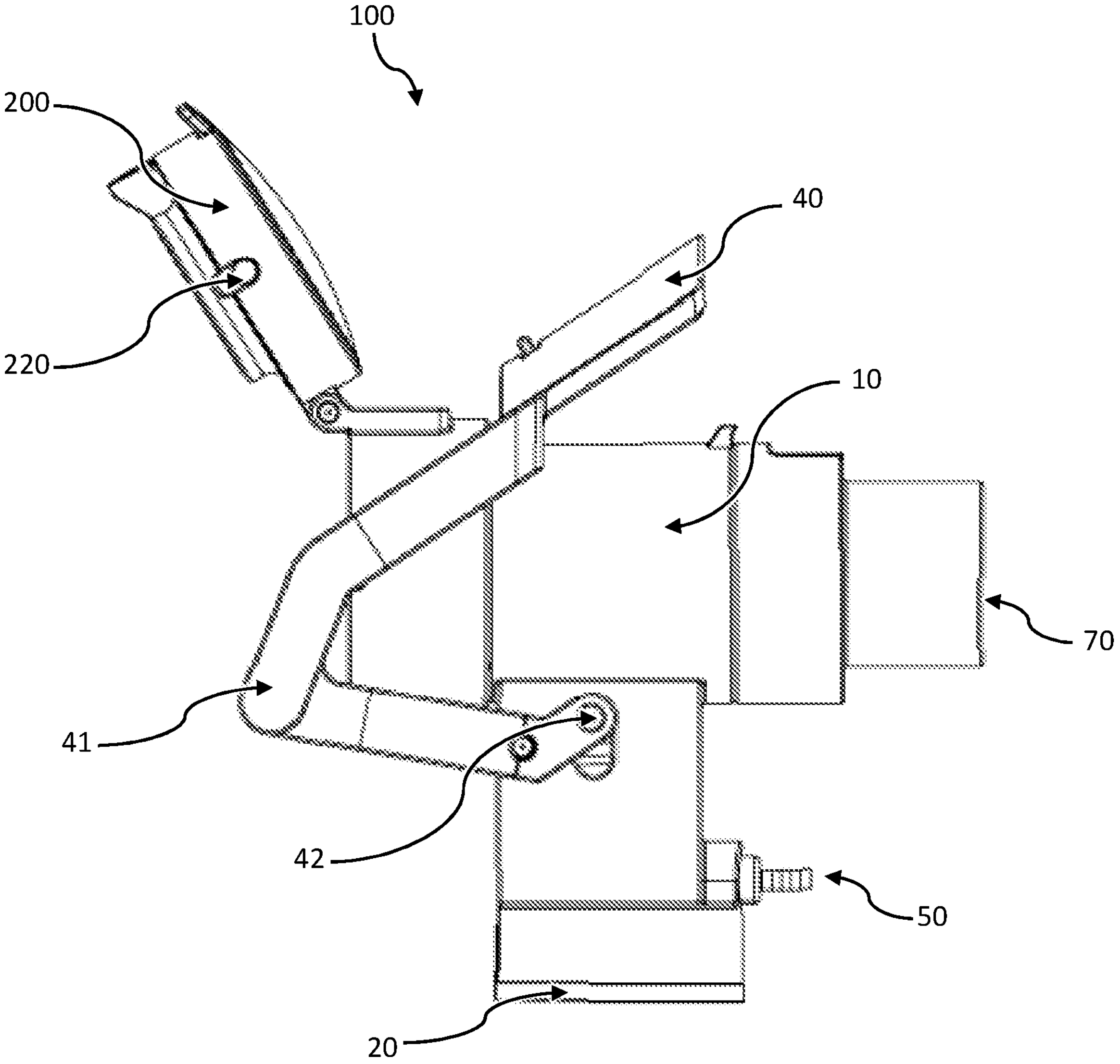

FIGS. 3*a*-3*d* show another, e.g. alternative, example of a coupler device 100 with a movable cover 200 formed as a pivoting door. Here, the securing means comprise the broach lever 40 having a pair of lever arms 41 that are pivotably coupled to the coupler housing with a pivot axis 42. The broach lever 40 secures the door 200, shown in FIGS. 3*a*, 3*c* when the broaching element is in a broaching position to broach the beverage container. The broach lever 40 is in a door releasing position, shown in FIGS. 3*b*, 3*d* when the broaching element is in a non broaching position. The door 200 comprises a pair of projection elements 220 formed as a notch or tab on opposite sides of the door 200 that cooperate with respective locking grooves 43 that are provided in each of the broach lever arms 41. Each locking groove 43 enables the corresponding protrusion 220 to move along the length of the groove so that the lever arms can be pivoted with the protrusions guided in the grooves. Upon closing the broach lever 40 as shown in FIGS. 3*a*, 3*c* the lever arms act against the door 200, closing it tightly and securely when reaching the closed position of the broach lever.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A coupler device arranged for bringing in fluid communication a beverage chamber of a beverage container and a beverage dispensing line, the coupler device comprising:

a housing with a coupling organ arranged for detachably coupling the housing to the beverage container;

a beverage channel extending through the housing between a beverage inlet on a beverage inlet side of the housing and a beverage outlet at a beverage outlet side of the housing, the beverage inlet configured for connecting a first dispensing line part of the beverage dispensing line and the beverage outlet configured for connecting a second dispensing line part of the beverage dispensing line; and a broach element movably arranged relative to the housing for broaching the beverage container to bring the beverage chamber in fluid communication with the first dispensing line part;

wherein the coupler housing comprises a cover movably arranged to move between an open position in which the cover enables access to the beverage inlet for connecting the first dispensing line part and a closed position in which the cover prevents a connecting of the first dispensing line part to the beverage inlet, and wherein the coupler comprises securing means configured for securing the cover in the closed position.

2. The coupler device according to claim 1, wherein the cover comprises a door pivotably connected to the inlet side of the coupler housing.

3. The coupler device according to claim 1, wherein the cover in the closed position and the inlet side of the housing define a chamber arranged for receiving at least an end portion of the first dispensing line part.

4. The coupler device according to claim 1, wherein the securing means are operatively coupled to the broach element and configured to secure the cover in the closed position in dependence on a position of the broach element.

5. The coupler device according to claim 4, wherein the securing means comprises a latch movably arranged relative to the cover in the closed position between a locking position in which the cover is secured in the closed position and a release position in which the cover is free to move between the closed position and the open position.

6. The coupler device according to claim 5, wherein the latch is coupled to the coupler housing with biasing means configured to bias the latch in the release position.

7. The coupler device according to claim 6, wherein the biasing means is operatively coupled to the broach element and configured to secure the cover in the closed position in dependence on a position of the broach element.

8. The coupler device according to claim 7, wherein the broach element comprises a broach piston inside the housing, the broach piston coupled to a broach lever of the coupler device for moving the broach piston axially between a lowered position relative to the coupling organ for broaching the beverage container and a raised position relative to the coupling organ.

9. The coupler device according to claim 8, wherein the securing means comprises a movable blocking plate having a through opening arranged to enable axial movement of the broach piston through the blocking plate between the lowered position and raised position when the blocking plate is in an unblocking position and to prevent axial movement of the broach piston when the blocking plate is in a blocking position.

10. The coupler device according to claim 9, wherein the blocking plate is coupled to the latch and biased with biasing means against the coupler housing and configured to secure the door against the coupler housing when the blocking plate is in the unblocking position and the broach piston in the lowered position.

11. The coupler device according to claim 4, wherein the securing means comprise a lever pivotably coupled to the coupler housing and arranged to pivot between a cover securing position in which the lever clamps the cover against the housing and a cover releasing position in which the lever enables the cover to be moved in the open position.

12. The coupler device according to claim 11, wherein the lever is a broach lever arranged to actuate the broaching element, wherein the broaching element is in a broaching position to broach the beverage container when the lever is in the cover securing position and the broaching element is in a non broaching position when the lever is in the cover releasing position.

13. The coupler device according to claim 11, wherein the lever comprises a lever arm arranged to act against the cover in the cover securing position.

14. The coupler device according to claim 13, wherein the lever arm comprises a locking groove and the cover comprises a projection element, the locking groove arranged to enable movement of the projection element over the length of the groove along the lever arm.

15. A system comprising: a beverage container having a beverage chamber for containing a beverage, the container having a container outlet provided with a sealing member arranged to enable opening of the container outlet, and a coupler device in accordance with claim 1, the broach element of the coupler device being configured, when coupled to the container, for opening the container outlet by movement of the broach element.

* * * * *